United States Patent
Birinov et al.

(10) Patent No.: US 8,107,749 B2
(45) Date of Patent: Jan. 31, 2012

(54) APPARATUS, METHOD, AND MEDIUM FOR ENCODING/DECODING OF COLOR IMAGE AND VIDEO USING INTER- COLOR-COMPONENT PREDICTION ACCORDING TO CODING MODES

(75) Inventors: Dmitri Birinov, Yongin-si (KR); Hyun Mun Kim, Seongnam-si (KR); Daesung Cho, Seoul (KR); Wooshik Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 829 days.

(21) Appl. No.: 11/487,314

(22) Filed: Jul. 17, 2006

(65) Prior Publication Data
US 2007/0014478 A1 Jan. 18, 2007

(30) Foreign Application Priority Data
Jul. 15, 2005 (KR) .................. 10-2005-0064502

(51) Int. Cl.
G06K 9/46 (2006.01)
(52) U.S. Cl. .................................................. 382/236
(58) Field of Classification Search .................. 382/100, 382/162, 163, 164, 165, 166, 167, 168, 171, 382/173, 232, 233, 234, 235, 236, 237, 238, 382/239, 240, 244, 245, 246, 247, 248, 249, 382/250, 251, 252, 253, 254, 266, 276, 277; 345/418, 426, 581, 589, 593, 594, 596, 597, 345/603, 604; 348/32, 34, 571, 608
See application file for complete search history.

(56) References Cited

U.S. PATENT DOCUMENTS
5,223,926 A * 6/1993 Stone et al. .............. 375/240.01
(Continued)

FOREIGN PATENT DOCUMENTS
KR 10-2005-0009216 1/2005

OTHER PUBLICATIONS

Nakane et al., "Fractal coding of color images using the correlation between Y and C components", Visual Communication and Image Processing 2003, Proceedings of SPIE vol. 5150, p. 2043-2051.*
Malvar et al., "YCoCg-R: A Color Space with RGB Reversibility and Low Dynamic Range", Joint Video Team (JVT) of ISO/IEC MPEG and ITU-T VCEG, Group Meeting Jul. 22-24, 2003, Document JVT-I014r3, Aug. 12, 2003, p. 1-8.*

(Continued)

Primary Examiner — Jingge Wu
Assistant Examiner — Tahmina Ansari
(74) Attorney, Agent, or Firm — Staas & Halsey LLP

(57) ABSTRACT

A color image and video encoding and/or decoding apparatus, method, and medium using inter-color-component prediction in accordance with an encoding mode are provided. The encoding apparatus for encoding an original image including at least two color image components, includes: a residue generation unit, if the encoding mode is inter mode, generating a temporal residue by obtaining the difference of a current image and a prediction image obtained by estimating a motion in units of blocks between the current image and a previous image of each color component; a residue color prediction unit encoding the temporal residue of the residue generation unit, by performing residue inter-color-component prediction; an intra color prediction unit, if the encoding mode is intra mode, encoding the original image by performing inter-color-component prediction of the original image; and an entropy encoding unit generating a bitstream by entropy encoding the result value of the residue color prediction unit or the intra color prediction unit. According to the apparatus, method, and medium, a color image or video data can be directly compressed effectively without a conventional color transform process. Furthermore, by using the correlation of image components, redundant information between color components varying with respect to the encoding mode is removed so that the encoding efficiency can be enhanced.

28 Claims, 6 Drawing Sheets

U.S. PATENT DOCUMENTS

| | | | | |
|---|---|---|---|---|
| 5,379,356 | A * | 1/1995 | Purcell et al. | 382/233 |
| 5,790,712 | A * | 8/1998 | Fandrianto et al. | 382/276 |
| 6,021,224 | A * | 2/2000 | Castelli et al. | 382/232 |
| 2001/0019630 | A1* | 9/2001 | Johnson | 382/232 |
| 2003/0113026 | A1* | 6/2003 | Srinivasan et al. | 382/239 |
| 2005/0111741 | A1* | 5/2005 | Kim et al. | 382/232 |
| 2005/0141617 | A1* | 6/2005 | Kim et al. | 375/240.21 |
| 2005/0243920 | A1* | 11/2005 | Murakami et al. | 375/240.12 |
| 2005/0259730 | A1* | 11/2005 | Sun | 375/240.03 |
| 2006/0146191 | A1* | 7/2006 | Kim et al. | 348/557 |
| 2007/0019872 | A1* | 1/2007 | Birinov et al. | 382/236 |

OTHER PUBLICATIONS

Hurtgen et al "Fractal Transform Coding of Color Images", Visual Communications and Image Processing, SPIE, 94, pp. 1 of 9 (1683-1691).*

Proposed SMPTE Standard for Television: VC-1 Compressed Video Bitstream Format and Decoding Process, SMPTE 421M, FCD, Apr. 1, 2005.

Korean Office Action dated Feb. 17, 2011, issued in Korean Patent Application No. 10-2005-0064502.

* cited by examiner

APPARATUS, METHOD, AND MEDIUM FOR ENCODING/DECODING OF COLOR IMAGE AND VIDEO USING INTER-COLOR-COMPONENT PREDICTION ACCORDING TO CODING MODES

CROSS-REFERENCE TO RELATED APPLICATIONS

This application claims the benefit of Korean Patent Application No. 10-2005-0064502, filed on Jul. 15, 2005, in the Korean Intellectual Property Office, the disclosure of which is incorporated herein in its entirety by reference.

BACKGROUND OF THE INVENTION

1. Field of the Invention

The present invention relates to image encoding and decoding, and more particularly, to a color image encoding and/or decoding apparatus, method, and medium using inter-color-component prediction in accordance with an encoding mode.

2. Description of the Related Art

In video compression, generally, in order to increase the compression ratio, a color image format such as R-G-B and X—Y—Z is converted into an image format appropriate to compression, such as Y—Cr-Cb. However, when conversion to Y—Cr-Cb is performed, the quality of an image is damaged basically. Also, generally, when the Y—Cr-Cb image is compressed, the magnitudes of the Cr and Cb components are reduced approximately four times and then encoded. Accordingly, when the Y—Cr-Cb image is encoded, it is difficult to restore a high quality image close to the original image. As an example, there is a VC-1 standard technology that has been undergoing standardization recently.

As another problem, if in order to reduce this loss by the conversion into the Y—Cr-Cb format, each of the R-G-B color components is encoded independently in the conventional Y—Cr-Cb encoder. The correlation remaining between the R-G-B components must be used. Therefore, the encoding efficiency is lowered.

SUMMARY OF THE INVENTION

Additional aspects, features, and/or advantages of the invention will be set forth in part in the description which follows and, in part, will be apparent from the description, or may be learned by practice of the invention.

The present invention provides a color image and video encoding apparatus, method, and medium using inter-color-component prediction according to an encoding mode, by which in order to effectively compress directly a color image or video data without a process of the conventional color conversion process, redundancy between color components is reduced by using the correlation of image components, such that the encoding efficiency is enhanced and redundant information between respective color components varying according to the encoding mode is removed.

The present invention also provides a color image and video decoding apparatus, method, and medium of decoding a color image and video data encoded using inter-color-component prediction according to an encoding mode.

According to an aspect of the present invention, there is provided a color image and video encoding apparatus using inter-color-component prediction according to an encoding mode, for encoding an original image including at least two color image components, the apparatus including: a residue generation unit, if the encoding mode is inter mode, generating a temporal residue by obtaining the difference of a current image and a prediction image obtained by estimating a motion in units of blocks between the current image and a previous image of each color component; a residue color prediction unit encoding the temporal residue of the residue generation unit, by performing residue inter-color-component prediction; an intra color prediction unit, if the encoding mode is intra mode, encoding the original image by performing inter-color-component prediction of the original image; and an entropy encoding unit generating a bitstream by entropy encoding the result value of the residue color prediction unit or the intra color prediction unit.

The intra color prediction unit and the residue color prediction unit may use prediction methods different to each other. The intra color prediction unit and the residue color prediction unit may use identical prediction methods. The residue color prediction unit may use a YCoCg transform equation or a YCoCg-R transform equation. The residue color prediction unit may perform encoding by subtracting the residue value of the G component from the residue values of the R and B components. The intra color prediction unit may use a YCoCg transform equation or a YCoCg-R transform equation. The intra color prediction unit may perform encoding by subtracting the residue value of the G component from the residue values of the R and B components.

According to another aspect of the present invention, there is provided a color image and video encoding method using inter-color-component prediction according to an encoding mode, for encoding an original image including at least two color image components, the method including: if the encoding mode is inter mode, generating a temporal residue by obtaining the difference of a current image and a prediction image obtained by estimating a motion in units of blocks between the current image and a previous image of each color component; encoding the temporal residue, by performing residue inter-color-component prediction; if the encoding mode is intra mode, encoding the original image by performing inter-color-component prediction of the original image; and generating a bitstream by entropy encoding the result value of the residue color prediction in the inter mode or the result value of the inter-color-component prediction in the intra mode.

The intra color prediction and the residue color prediction may use prediction methods different to each other. The intra color prediction and the residue color prediction may use identical prediction methods. In the residue color prediction a CoCg transform equation or a YCoCg-R transform equation may be used, or encoding may be performed by subtracting the residue value of the G component from the residue values of the R and B components. In the intra color prediction a CoCg transform equation or a YCoCg-R transform equation may be used, or encoding may be performed by subtracting the residue value of the G component from the residue values of the R and B components.

According to still another aspect of the present invention, there is provided a color image and video decoding apparatus using inter-color-component prediction according to an encoding mode, for decoding a bitstream obtained by compressing an original image including at least two color image components, by using inter-color-component prediction according to an encoding mode, the apparatus including: an entropy decoding unit entropy decoding the bitstream; a residue color compensation unit, if the decoding mode is inter mode, restoring the residue data of each color component from the data restored in the entropy decoding unit; a motion prediction unit predicting the pixel values of a current image by obtaining a prediction image from a previous image; an original image generation unit restoring an image from the residue restored in the residue color compensation unit and the prediction image obtained from the motion prediction unit; and an intra color compensation unit, if the decoding mode is intra mode, restoring an original image, by compensating each color component from the data restored in the entropy decoding unit.

The intra color compensation unit and the residue color compensation unit may use prediction methods different to each other. The intra color compensation unit and the residue color compensation unit may use identical prediction methods.

The residue color compensation unit may use a YCoCg transform equation or a YCoCg-R transform equation. The residue color compensation unit may perform encoding by subtracting the residue value of the G component from the residue values of the R and B components.

The intra color compensation unit may use a YCoCg transform equation or a YCoCg-R transform equation. The intra color compensation unit may perform encoding by subtracting the residue value of the G component from the residue values of the R and B components.

According to yet still another aspect of the present invention, there is provided a color image and video decoding method using inter-color-component prediction according to an encoding mode, for decoding a bitstream obtained by compressing an original image including at least two color image components, by using inter-color-component prediction according to an encoding mode, the method including: entropy decoding the bitstream; if the decoding mode is inter mode, restoring the residue data of each color component from the entropy decoded data; predicting the pixel values of a current image by obtaining a prediction image from a previous image; restoring an image from the residue color compensated residue, and the motion predicted image; and if the decoding mode is intra mode, restoring an original image, by compensating each color component from the entropy decoded data.

The intra color compensation and the residue color compensation may use prediction methods different to each other. The intra color compensation and the residue color compensation may use identical prediction methods.

In the residue color compensation a CoCg transform equation or a YCoCg-R transform equation may be used, or a residue may be restored by adding the residue values of the R and B components and the residue value of the G component. In the intra color compensation a CoCg transform equation or a YCoCg-R transform equation may be used, or a residue may be restored by adding the residue values of the R and B components and the residue value of the G component.

According to another aspect of the present invention, there is provided a color image and video encoding method using inter-color-component prediction according to an encoding mode, for encoding an original image including at least two color image components, the method including: generating a temporal residue by obtaining the difference of a current image and a prediction image obtained by estimating a motion in units of blocks between the current image and a previous image of each color image component if the encoding mode is inter mode; encoding the temporal residue, by performing residue inter-color-component prediction if the encoding mode is inter mode; and generating a bitstream by entropy encoding the result value of the residue color prediction in the inter mode. In addition, according to another aspect of the present invention, there is provided a medium including computer readable instructions implementing the above method.

According to another aspect of the present invention, there is provided a color image and video encoding method using inter-color-component prediction according to an encoding mode, for encoding an original image including at least two color image components, the method including: encoding the original image by performing inter-color-component prediction of the original image if the encoding mode is intra mode; and generating a bitstream by entropy encoding the result value of the inter-color-component prediction in the intra mode. In addition, according to another aspect of the present invention, there is provided a medium including computer readable instructions implementing the method.

According to another aspect of the present invention, there is provided a color image and video encoding method using inter-color-component prediction according to an encoding mode, for encoding an original image including at least two color image components, the method including: determining whether the encoding mode is intra mode or inter mode; generating temporal residue if the encoding mode is the inter mode; performing residue inter-color-component prediction if the encoding mode is the inter mode to provide residue result value; performing inter-color-component prediction of the original image if the encoding mode is the intra mode to provide a result value; and entropy encoding the residue result value if the encoding mode is the inter mode and entropy encoding the result value if the encoding mode is the intra mode. In addition, according to another aspect of the present invention, there is provided a medium including computer readable instructions implementing the method.

According to another aspect of the present invention, there is provided a color image and video decoding method using inter-color-component prediction according to an encoding mode, for decoding a bitstream obtained by compressing an original image including at least two color image components, by using inter-color-component prediction according to an encoding mode, the method including: entropy decoding the bitstream; determining whether the encoding mode is intra mode or inter mode; performing residue color compensation if the decoding mode is inter mode; performing time prediction decoding from the color compensated residue if the decoding mode is inter mode to restore the original image; performing intra color compensation of each color component from the entropy decoded data to restore the original image. In addition, according to another aspect of the present invention, there is provided a medium including computer readable instructions implementing the method.

According to an additional aspect of the present invention, there is provided a computer readable recording medium having embodied thereon a computer program for executing the methods.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
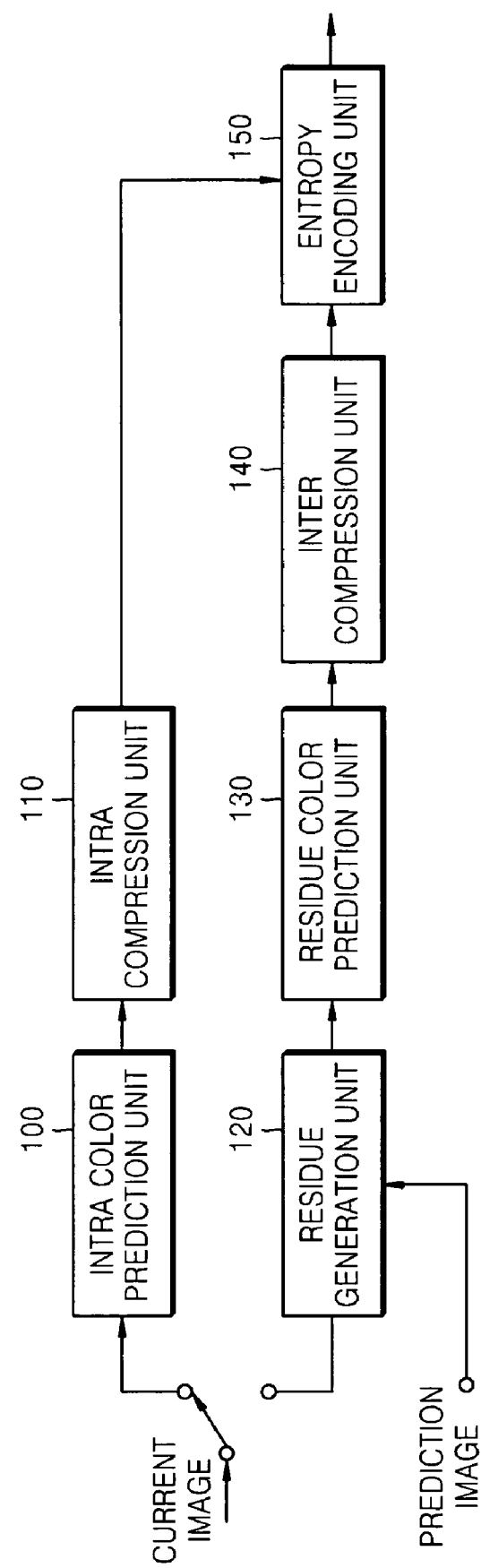
FIG. 1 is a block diagram of a color image and video encoding apparatus using inter-color-component prediction in accordance with an encoding mode according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

First, a color image and video encoding method, apparatus, and medium using inter-color-component prediction in accordance with an encoding mode according to an exemplary embodiment of the present invention will now be explained.

FIG. 1 is a block diagram of a color image and video encoding apparatus using inter-color-component prediction in accordance with an encoding mode according to an exemplary embodiment of the present invention. The encoding apparatus includes a residue generation unit 120, a residue color prediction unit 130, an intra color prediction unit 100, and an entropy encoding unit 150. Also, the encoding apparatus may further include an intra compression unit 110, and an inter compression unit 140.

In the present invention, an original color image includes at least two color image components and may be any one of R-G-B, Y—Cb-Cr, and X—Y—Z format images.

If the encoding mode is inter mode, the residue generation unit 120 generates a temporal residue by obtaining the difference of a current image and a prediction image obtained by estimating a motion in units of blocks of a predetermined size between a previous image and the current image of each color component.

The residue color prediction unit 130 encodes the temporal residue of the residue generation unit, by performing residue inter-color-component prediction.

If the encoding mode is intra mode, the intra color prediction unit 100 encodes the original image by performing inter-color-component prediction of the original image.

The entropy encoding unit 150 generates a bitstream by entropy encoding the result value of the residue color prediction unit 130 or the intra color prediction unit 100.

The inter compression unit 140 performs frequency domain transform and quantization of the result value of the residue color prediction unit 130 and outputs the result to the entropy encoding unit 150.

The intra compression unit 110 performs frequency domain transform, quantization, and DC/AC coefficient prediction of the result value of the intra color prediction unit 100 and outputs the result to the entropy encoding unit 150.

The intra color prediction unit 100 and the residue color prediction unit 130 may use different prediction methods or identical prediction methods.

Also, the intra color prediction unit may use a YCoCg transform equation or a YCoCg-R transform equation, or may subtract the residue value of the G component from the residue values of the R and B components and then encode the result.

Like the intra color prediction unit 100, the residue color prediction unit 130 may use a YCoCg transform equation or a YCoCg-R transform equation, or may subtract the residue value of the G component from the residue values of the R and B components and then encode the result.

Figure 2:
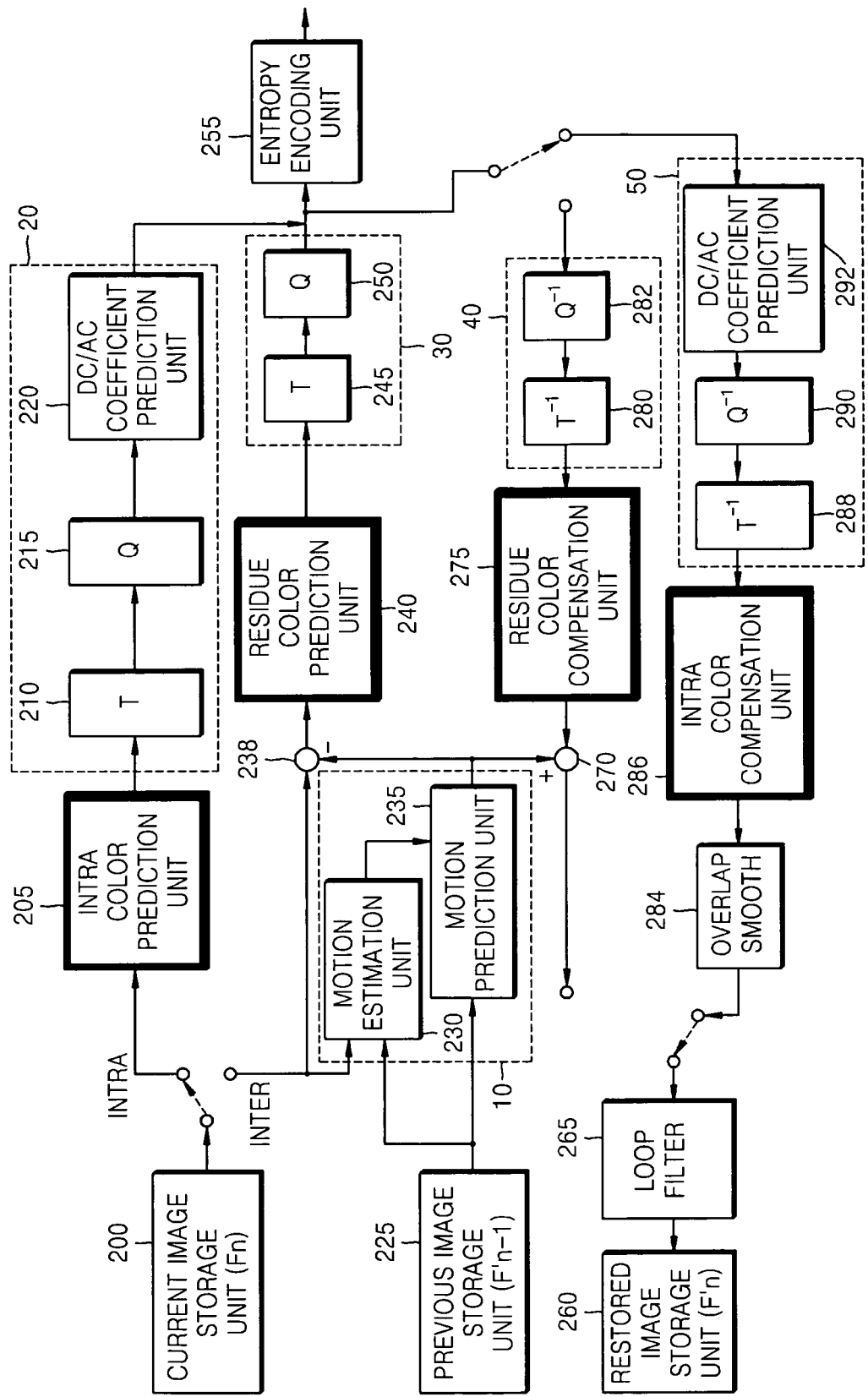
FIG. 2 is a more detailed block diagram of a color image and video encoding apparatus using inter-color-component prediction in accordance with an encoding mode according to an exemplary embodiment of the present invention.

FIG. 2 is a more detailed block diagram of a color image and video encoding apparatus using inter-color-component prediction in accordance with an encoding mode according to an exemplary embodiment of the present invention.

The encoding apparatus of FIG. 2 adds an intra color prediction unit 205, a residue color prediction unit 240, a residue color compensation unit 275, and an intra color compensation unit 286 that are aspects, features, and advantages of the present invention, added to or incorporated into a block diagram of an encoding apparatus according to the conventional video encoding technology, that is, the VC-1 video compression standardization technology ("Proposed SMPTE Standard for Television: VC-1 Compressed Video Bitstream Format and Decoding Process", SMPTE42M, FCD, 2005) of the Society of Motion Picture and Television Engineers (SMPTE) that has been undergoing standardization recently. Here, a color image including G, R, and B components is directly encoded.

The encoding apparatus includes a current image storage unit (Fn) 200, a previous image storage unit (F'n-1) 225, a motion prediction image generation unit 10, an intra compression encoding unit 20, an inter compression encoding unit 30, an intra inverse compression encoding unit 50, an inter inverse compression encoding unit 40, a residue generation unit 238, an original image generation unit 270, an entropy encoding unit 255, a loop filter 265, an overlap smooth unit 284, an intra color prediction unit 205, a residue color prediction unit 240, a residue color compensation unit 275, and an intra color compensation unit 286.

The current image storage unit 200 receives and stores an original color image.

The previous image storage unit 225 stores a decoded previous color image with three components.

In order to increase the encoding efficiency, the encoding apparatus uses an inter method in which time prediction is performed by estimating a motion in units of blocks between a previous frame and a current frame, and an intra method in which transform coefficient prediction is used in a spatially adjacent block in the current frame.

The motion prediction image generation unit 10 includes a motion estimation unit 230 and a motion prediction unit 235. The motion estimation unit 230 estimates a motion in units of blocks between the previous frame and the current frame. The motion prediction unit 235 outputs a block corresponding to a motion vector generated from the motion estimation unit 230.

The residue generation unit 238 generates a residue corresponding to the difference of a block of the image of the motion prediction image generation unit 10 and a corresponding block of the current frame.

The inter compression encoding unit 30 compresses and encodes the residue generated in the residue generation unit 238, and includes a frequency domain transform unit 245 and a quantization unit 250.

The frequency domain transform unit 245 compresses the residue generated in the residue generation unit 238. The quantization unit 250 quantizes the data compressed in the frequency domain transform unit 245.

The intra compression encoding unit 20 compresses the original color image stored in the current image storage unit 200 by an intra method, and includes a frequency domain transform unit 210, a quantization unit 215, and a DC/AC coefficient prediction unit 220.

The frequency domain transform unit 210 compresses in units of blocks, the image output from the current image storage unit 200, by using a transform such as the discrete cosine transform (DCT). The quantization unit 215 quantizes the data compressed in the frequency domain transform unit 210.

The DC/AC coefficient prediction unit 220 performs prediction, by estimating a prediction direction from a transform coefficient spatially close to a transform coefficient block of the current frame.

The entropy encoding unit 255 generates a bitstream, by entropy encoding the data encoded in the intra compression encoding unit 20 and the inter compression encoding unit 30.

The inter inverse compression unit 40 includes an inverse frequency domain transform unit 280 and an inverse quantization unit 282. The inverse quantization unit 282 inverse quantizes quantized data. The inverse frequency domain transform unit 280 restores a residue image by performing inverse frequency domain transform of the inverse quantized data.

The result is added through the original image generation unit 270 to the block value predicted through the inter prediction method used in the motion estimation unit 230 and the motion prediction unit 235. The loop filter 265 generates an image F'n to be restored in a decoding apparatus through the loop filter 265 reducing a block effect. The image F'n can be stored in restored image storage unit 260.

The intra inverse compression encoding unit 50 includes an inverse frequency domain transform unit 288, an inverse quantization unit 290, and a DC/AC coefficient prediction unit 292.

The intra color prediction unit 205 receives an input of an original image. If the encoding mode is intra mode, the intra color prediction unit 205 compresses the data, by performing inter-color-component prediction of the original image.

The residue color prediction unit 240 encodes the temporal residue generated in the residue generation unit 238, by performing inter-color-component prediction.

If the encoding mode is inter mode, the residue color compensation unit 275 restores the residue data of each color component from the entropy decoded data.

If the encoding mode is intra mode, the residue intra color compensation unit 286 restores an original image, by compensating each color component of the image output from the inverse frequency domain transform unit 288.

Figure 3:
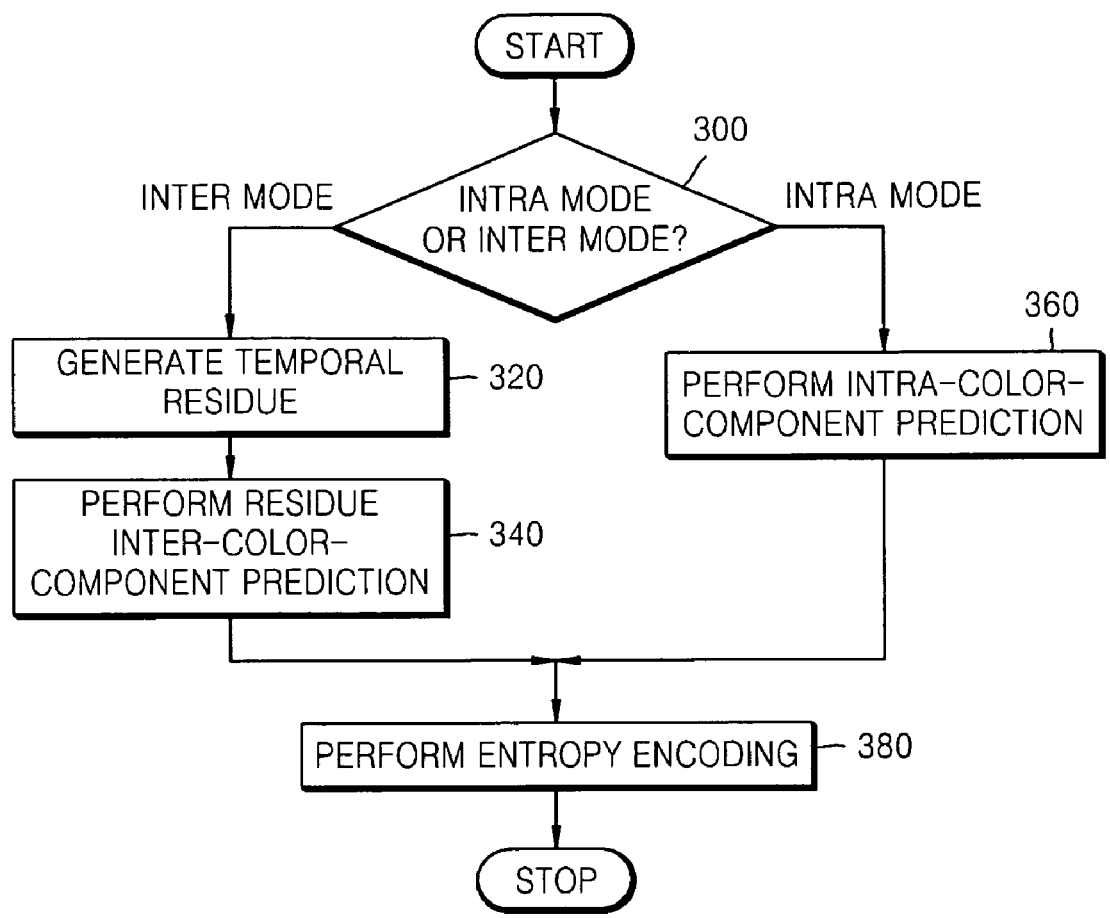
FIG. 3 is a flowchart of a method of encoding a color image and video data using inter-color-component prediction in accordance with an encoding mode according to an exemplary embodiment of the present invention.

FIG. 3 is a flowchart of a method of encoding a color image and video data using inter-color-component prediction in accordance with an encoding mode according to an exemplary embodiment of the present invention.

First, it is determined whether the encoding mode is intra mode or inter mode in operation 300.

If it is the inter mode, a motion is estimated in units of blocks of a predetermined size between a current image and a previous image of each color component, in order to obtain a prediction image, and a residue corresponding to the difference of the prediction image and the current image is generated in operation 320. Then, the temporal residue is encoded by performing residue inter-color-component prediction in operation 340, and then, by entropy encoding the residue, a bitstream is generated in operation 380.

The inter mode will now be explained in more detail. In the inter mode, first, in the G component (G plane), residue information of the G value is obtained by subtracting a value predicted by using a temporally adjacent image value, from the G component in the same manner as in the conventional encoding apparatus. This residue value can be expressed as the following equation 1:

$$\Delta G = G - Gp \quad (1)$$

For the R and B components, motion prediction 235 is performed in each color plane in the same manner as for the G component. Residues obtained from the predictions are expressed as the following equations 2 and 3:

$$\Delta R = R - Rp \quad (2)$$

$$\Delta B = B - Bp \quad (3)$$

where Rp and Bp are obtained through predictions with temporally adjacent image values.

In order to remove redundant information among respective color component residues, residue color prediction is performed. Loss should not occur when residue transform is performed. For example, there is a simple method of prediction using ΔG as a predictor in which prediction is performed by subtracting ΔR and ΔB from ΔG. This method can be expressed as a prediction expression and a compensation expression as the following equation 4:

$$\begin{bmatrix} \Delta^2 R \\ \Delta^2 G \\ \Delta^2 B \end{bmatrix} = \begin{bmatrix} 1 & -1 & 0 \\ 0 & 1 & 0 \\ 0 & -1 & 1 \end{bmatrix} \begin{bmatrix} \Delta R \\ \Delta G \\ \Delta B \end{bmatrix} \quad (4)$$

$$\begin{bmatrix} \Delta R \\ \Delta G \\ \Delta B \end{bmatrix} = \begin{bmatrix} 1 & 1 & 0 \\ 0 & 1 & 0 \\ 0 & 1 & 1 \end{bmatrix} \begin{bmatrix} \Delta^2 R \\ \Delta^2 G \\ \Delta^2 B \end{bmatrix}$$

where $\Delta^2 R$, $\Delta^2 G$ and $\Delta^2 B$ are predicted residue signals.

Also, in order to efficiently remove redundancy between respective components, a color prediction equation made considering the correlation between respective color components can be applied. The YCoCg transform equation and inverse transform equation ("YCoCg-R: A Color Space with RGB Reversibility and Low Dynamic Range", ISO/IEC JTC1/SC29/WG11 and ITU-T SG16 Q. 6 Document JVT-I014r3, San Diego, September, 2003) are as the following equation 5:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix} \quad (5)$$

$$\begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix}$$

When the YCoCg transform equation and inverse transform equation are applied to residue transform and inverse transform, the following equation 6 is obtained:

$$\begin{bmatrix} \Delta^2 R \\ \Delta^2 G \\ \Delta^2 B \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} \Delta R \\ \Delta G \\ \Delta B \end{bmatrix} \quad (6)$$

$$\begin{bmatrix} \Delta R \\ \Delta G \\ \Delta B \end{bmatrix} = \begin{bmatrix} 1 & 1 & -1 \\ 1 & 0 & 1 \\ 1 & -1 & -1 \end{bmatrix} \begin{bmatrix} \Delta^2 R \\ \Delta^2 G \\ \Delta^2 B \end{bmatrix}$$

YCoCg-R ("YCoCg-R: A Color Space with RGB Reversibility and Low Dynamic Range", ISO/IEC JTC1/SC29/WG11 and ITU-T SG16 Q.6 Document JVT-IO14r3, San Diego, September, 2003) is obtained by improving the YCoCg transform using a lifting method. The transform and inverse transform equations are the following equation 7:

$$Co=R-B \quad t=Y-(Cg>>1) \quad t=B+(Co>>1) \quad G=Cg+t$$
$$Cg=G-t \Longleftrightarrow B=t-(Co>>1) \quad Y=t+(Cg>>1)$$
$$R=B+Co \quad (7)$$

These transform equations can be applied to a residue transform equation in the same manner.

If the encoding mode is the intra mode, inter-color-component prediction of an original image is performed in operation 360, and then by entropy encoding the result, a bitstream is generated in operation 380. The intra color prediction and the residue color prediction may use different prediction methods, or may use identical prediction methods. More specifically, in the intra mode, a residue image is not generated and redundant information between respective color components of the original image is removed through an intra color prediction process. There color prediction method used here may be one of the methods described above or another method may be used. The intra color prediction method may be the same method as the residue color prediction method or may be a different one. The original image may be any one of an R-G-B, and X—Y—Z format images or another.

Figure 4:
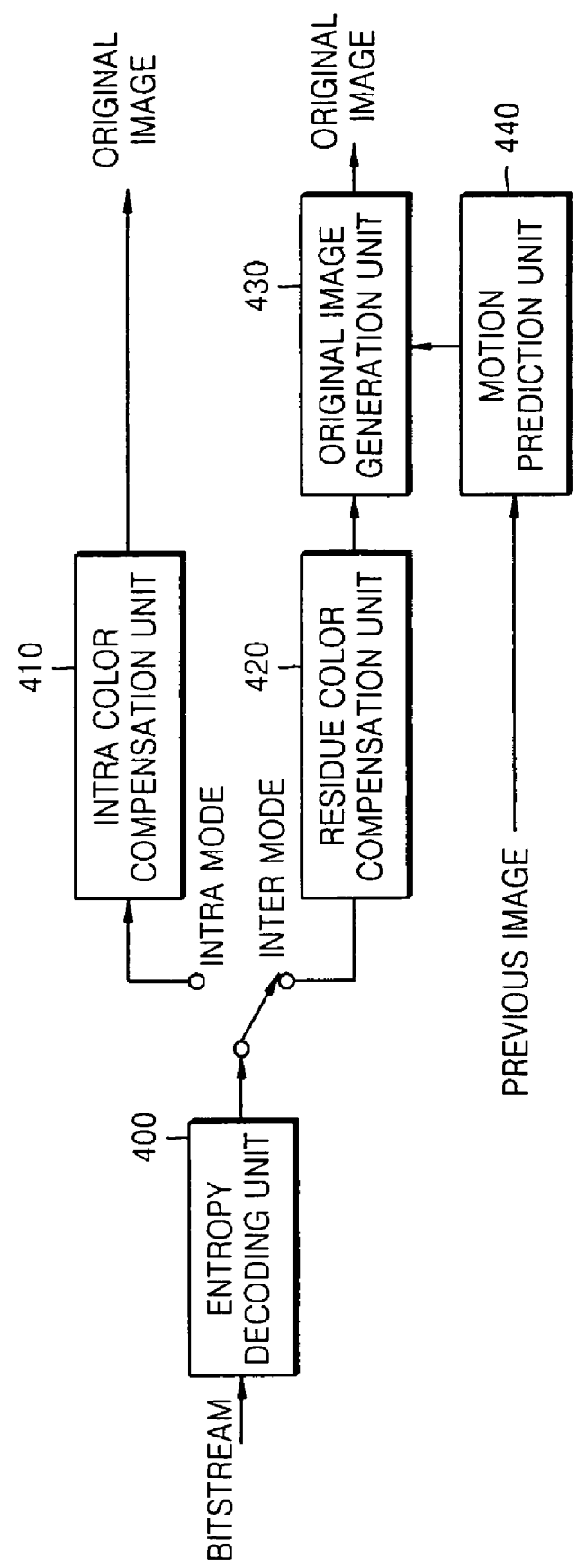
FIG. 4 is a block diagram of a color image and video decoding apparatus for decoding a color image and video encoded by using inter-color-component prediction in accordance with an encoding mode according to an exemplary embodiment of the present invention.

FIG. 4 is a block diagram of a color image and video decoding apparatus for decoding a color image and video encoded by using inter-color-component prediction in accordance with an encoding mode according to an exemplary embodiment of the present invention. The color image and video decoding apparatus includes an entropy decoding unit 400, a residue color compensation unit 420, a motion prediction unit 440, an original image generation unit 430, and an intra color compensation unit 410.

The entropy decoding unit 400 entropy decodes the bitstream. If the decoding mode is inter mode, the residue color compensation unit 420 restores the residue data of each color component from the data restored in the entropy decoding unit 400. The motion prediction unit 440 obtains a prediction image from a previous image and predicates the pixel values of a current image.

The original image generation unit 430 restores an image from the residue restored in the residue color compensation unit 420 and the prediction image obtained in the motion prediction unit 440. If the decoding mode is intra mode, the intra color compensation unit 410 restores an original image, by compensating each color component from the data restored in the entropy decoding unit 400. The intra color compensation unit 410 and the residue color compensation unit 420 may use different prediction compensation methods or may use identical prediction methods. The residue color compensation unit 420 may use a YCoCg inverse transform equation or a YCoCg-R inverse transform equation or may add the residue values of the R and B components and the residue value of the G component to restore a residue. Likewise, the intra color compensation unit 410 may use a YCoCg inverse transform equation or a YCoCg-R inverse transform equation or may add the residue values of the R and B components and the residue value of the G component to residue a residue.

Figure 5:
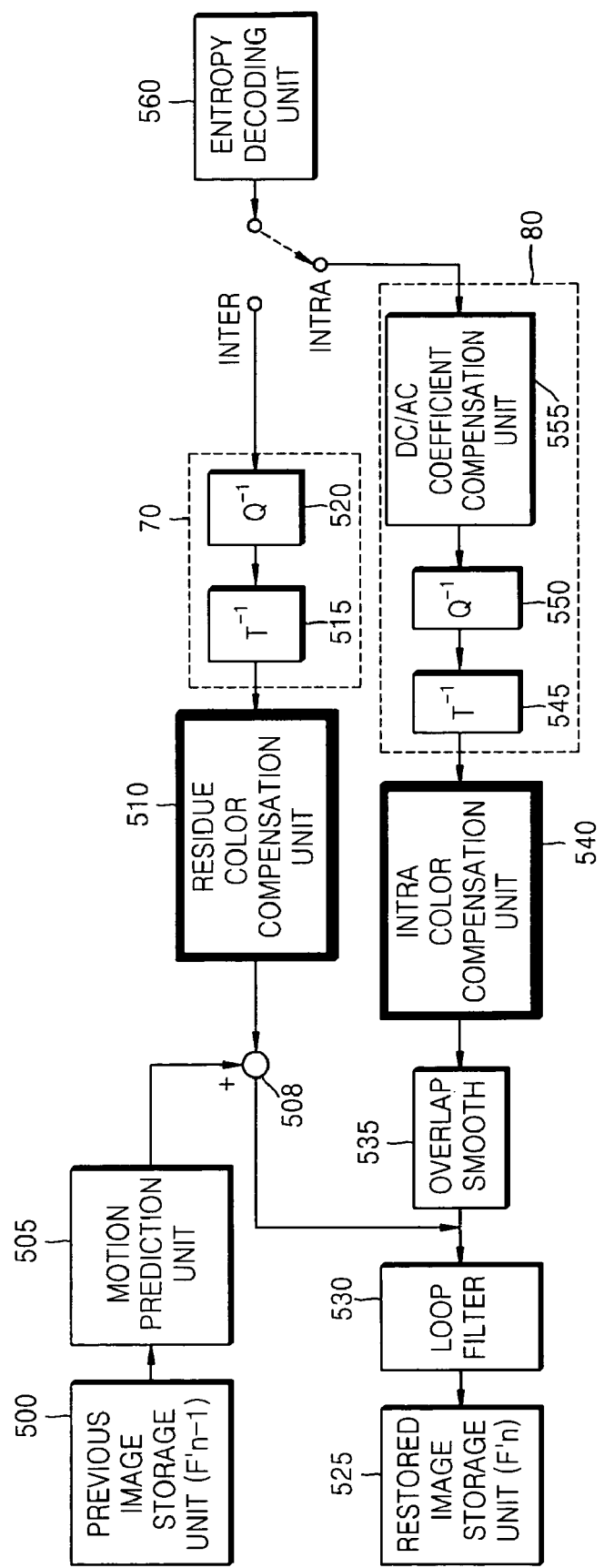
FIG. 5 is a block diagram of a color image and video decoding apparatus using inter-color-component prediction in accordance with an encoding mode according to an exemplary embodiment of the present invention.

FIG. 5 is a block diagram of a color image and video decoding apparatus using inter-color-component prediction in accordance with an encoding mode according to an exemplary embodiment of the present invention. The decoding apparatus of FIG. 5 adds a residue color compensation unit 510 and an intra color compensation unit 540 that are aspects, features, and advantages of the present invention, added to or incorporated into a block diagram of a decoding apparatus corresponding to the encoding apparatus using the conventional encoding technology (the VC-1 standard technology of the SMPTE) shown in FIG. 2. Here, a color image including G, R, and B components is directly encoded.

Referring to FIG. 5, the decoding apparatus includes an entropy decoding unit 560, a restored image storage unit (Fn) 525, a previous image storage unit (F'n-1) 500, an original image generation unit 508, an intra inverse compression decoding unit 80, an inter inverse compression decoding unit 70, a loop filter 530, an overlap smooth unit 535, and a motion prediction unit 505.

The decoding apparatus restores an image from a bitstream compressed through the encoding process of FIG. 1. The compressed data is entropy decoded in the entropy decoding unit 560. Then, if the decoding mode is the inter mode, first, the data passes through an inverse quantization unit 520 and an inverse frequency domain transform unit 515, and a restored original image is generated in an original image generation unit 508. If the decoding mode is the intra mode, the data passes through a DC/AC coefficient prediction unit 555, an inverse quantization unit 550, and an inverse frequency domain transform unit 545, sequentially.

The residue color compensation unit 510 that can be said to be the characteristic of the present invention compensates the residue data. Likewise, the intra color compensation unit 540 decodes the image information output from the inverse frequency domain transform unit 515.

Figure 6:
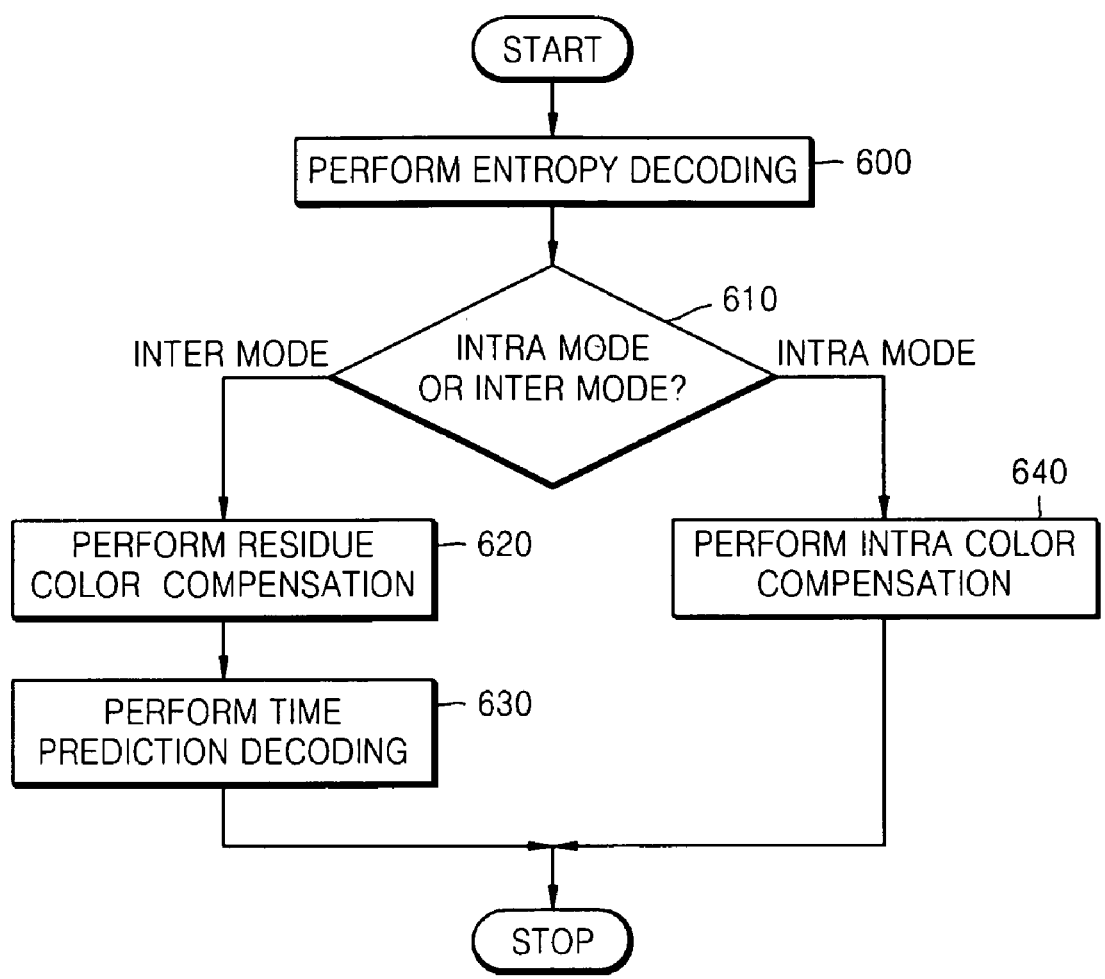
FIG. 6 is a flowchart of a color image and video decoding method of decoding a color image and video encoded by using inter-color-component in accordance with an encoding mode according to an exemplary embodiment of the present invention.

FIG. 6 is a flowchart of a color image and video decoding method of decoding a color image and video encoded by using inter-color-component in accordance with an encoding mode according to an exemplary embodiment of the present invention. The decoding method is performed in the reverse order of the encoding method. Referring to FIG. 6, a bitstream is entropy decoded in operation 600. After entropy decoding the bitstream, it is determined whether the decoding mode is inter mode or intra mode in operation 610. If the decoding mode is the inter mode, residue color compensation is performed to restore the residue signal of each component. By performing time prediction compensation for the residue signal of each component, a restore image is obtained. That is, in the inter mode, the residue data of each color component is restored from the entropy decoded data in operation 620. Then, a prediction image is obtained from a previous image and the pixel values of a current image are predicted. From the residue color compensated residues and the motion predicted image, an image is restored in operation 630.

Meanwhile, after the bitstream is entropy decoded, if the decoding mode is the intra mode, intra color compensation is performed. That is, in the intra mode, each color component is compensated from the entropy decoded data and an original image is restored in operation 640.

The intra color compensation and the residue color compensation may use different prediction compensation methods or may use identical prediction methods.

The residue color compensation may use the YCoCg inverse transform equation according to the equation 5, or the YCoCg-R inverse transform equation according to the equations 6 and 7. Also, by adding the residue values of the R and B components and the residue value of the G component, a residue can be restored. Likewise, the intra color compensation may use the YCoCg inverse transform equation or the YCoCg-R inverse transform equation or may add the residue values of the R and B components and the residue value of the G component to residue a residue.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

In addition to the above-described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code/instructions.

The computer readable code/instructions can be recorded in/on a medium in a variety of ways, with examples of the medium including magnetic storage media (e.g., floppy disks, hard disks, magnetic tapes, etc.), optical media (e.g., CD-ROMs, or DVDs), magneto-optical media (e.g., floptical disks), and hardware storage devices (e.g., read only memory media, random access memory media, flash memories, etc.). The medium/media may also be a distributed network, so that the computer readable code/instructions are stored and executed in a distributed fashion. The computer readable code/instructions may be executed by one or more processors.

According to the color image encoding and/or decoding method and apparatus using inter-color-component prediction according to an encoding mode, a color image or video data can be directly compressed effectively without a conventional color transform process.

Furthermore, by using the correlation of image components, redundant information between color components varying with respect to the encoding mode is removed so that the encoding efficiency can be enhanced.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A color image and video encoding apparatus using inter-color-component prediction according to an encoding mode, for encoding an original image including at least two color image components, the apparatus comprising:
a residue generation unit to generate a temporal residue by obtaining the difference of a current image and a prediction image obtained by estimating a motion in units of blocks between the current image and a previous image of each color image component if the encoding mode is inter mode;
a residue color prediction unit to encode the temporal residue of the residue generation unit, by performing residue inter-color-component prediction considering the correlation between respective color components for removing redundant information using at least one processor;
an inter compression unit to perform frequency domain transform and quantization of the result value of the residue color prediction unit using at least one processor; and
an intra color prediction unit to encode the original image by performing inter-color-component prediction of the original image if the encoding mode is intra mode;
an intra compression unit to perform frequency domain transform, quantization, and DC/AC coefficient prediction of the result value of the intra color prediction unit; and
an entropy encoding unit to generate a bitstream by entropy encoding the result value of the inter compression unit or the intra compression unit,
wherein redundant information between the color components is removed from the original image by not generating residues in the intra mode.

2. The apparatus of claim 1, wherein the intra color prediction unit and the residue color prediction unit use prediction methods different from each other.

3. The apparatus of claim 1, wherein the intra color prediction unit and the residue color prediction unit use identical prediction methods.

4. The apparatus of claim 1, wherein the original image is any one of R-G-B, Y—Cb-Cr, and X—Y—Z format images.

5. The apparatus of claim 1, wherein the residue color prediction unit uses a YCoCg transform equation or a YCoCg-R transform equation.

6. The apparatus of claim 1, wherein the residue color prediction unit performs encoding by subtracting the residue value of the G component from the residue values of the R and B components.

7. The apparatus of claim 1, wherein the intra color prediction unit uses a YCoCg transform equation or a YCoCg-R transform equation.

8. A color image and video encoding method using inter-color-component prediction according to an encoding mode, for encoding an original image including at least two color image components, the method comprising:
if the encoding mode is inter mode, generating a temporal residue by obtaining the difference of a current image and a prediction image obtained by estimating a motion in units of blocks between the current image and a previous image of each color image component;
encoding the temporal residue, by performing residue inter-color-component prediction considering the correlation between respective color components for removing redundant information;
compressing the encoded temporal residue, by performing frequency domain transform and quantization;
if the encoding mode is intra mode, encoding the original image by performing inter-color-component prediction of the original image;
compressing the encoded original image, by performing frequency domain transform, quantization, and DC/AC coefficient prediction; and
generating a bitstream by entropy encoding the result value of the compressed data in the inter mode or the result value of the compressed data in the intra mode, wherein redundant information between the color components is removed from the original image by not generating residues in the intra mode, and
wherein the method is performed using at least one processor.

9. The method of claim 8, wherein the intra color prediction and the residue color prediction use prediction methods different from each other.

10. The method of claim 8, wherein the intra color prediction and the residue color prediction use identical prediction methods.

11. The method of claim 8, wherein the original image is any one of R-G-B, Y—Cb-Cr, and X—Y—Z format images.

12. The method of claim 8, wherein in the residue color prediction a CoCg transform equation or a YCoCg-R transform equation is used, or encoding is performed by subtracting the residue value of the G component from the residue values of the R and B components.

13. A color image and video decoding apparatus using inter-color-component prediction according to an encoding mode, for decoding a bitstream obtained by compressing an original image including at least two color image components, by using inter-color-component prediction according to an encoding mode, the apparatus comprising:
an entropy decoding unit to entropy decode the bitstream, which was encoded using inter-color component prediction;
an inter inverse compression decoding unit to inverse quantize and inverse transform frequency domain the data restored in the inter inverse compression decoding unit, if the decoding mode is inter mode;
a residue color compensation unit to restore the residue data of each color component from the result value of the inter inverse compression decoding unit;
a motion prediction unit to predict the pixel values of a current image by obtaining a prediction image from a previous image using at least one processor;
an original image generation unit to restore an image from the residue restored in the residue color compensation unit and the prediction image obtained from the motion prediction unit;
an intra inverse compression decoding unit to predict DC/AC coefficient, inverse quantize, and inverse transform frequency domain the data restored in the entropy decoding unit, if the decoding mode is intra mode; and
an intra color compensation unit to restore an original image, by compensating each color component from the result value of the intra inverse compression decoding unit,
wherein redundant information between the color components is removed from the original image by not generating residues in the intra mode.

14. The apparatus of claim 13, the intra color compensation unit and the residue color compensation unit use prediction methods different from each other.

15. The apparatus of claim 13, wherein the intra color compensation unit and the residue color compensation unit use identical prediction methods.

16. The apparatus of claim 13, wherein the residue color compensation unit uses a YCoCg transform equation or a YCoCg-R transform equation.

17. The apparatus of claim 13, wherein the residue color compensation unit performs encoding by subtracting the residue value of the G component from the residue values of the R and B components.

18. The apparatus of claim 13, wherein the intra color compensation unit uses a YCoCg transform equation or a YCoCg-R transform equation.

19. A color image and video decoding method using inter-color-component prediction according to an encoding mode, for decoding a bitstream obtained by compressing an original image including at least two color image components, by using inter-color-component prediction according to an encoding mode, the method comprising:
entropy decoding the bitstream, which was encoded using inter-color component prediction;
if the decoding mode is inter mode, inverse compressing the entropy decoding data, by performing inverse quantization, and inverse frequency domain transform;
restoring the residue data of each color component from the result of the inverse compressed data;
predicting the pixel values of a current image by obtaining a prediction image from a previous image;
restoring an image from the residue color compensated residue, and the motion predicted image;
inverse compressing the entropy decoded data, by performing DC/AC coefficient prediction, inverse quantization, and inverse frequency domain transformation, if the decoding mode is intra mode; and
restoring an original image, by compensating each color component from the result of the inverse compressed data,
wherein redundant information between the color components is removed from the original image by not generating residues in the intra mode, and
wherein the method is performed using at least one processor.

20. The method of claim 19, wherein the intra color compensation and the residue color compensation use prediction methods different from each other.

21. The method of claim 19, wherein the intra color compensation and the residue color compensation use identical prediction methods.

22. The method of claim 19, wherein in the residue color compensation a CoCg transform equation or a YCoCg-R transform equation is used, or a residue is restored by adding the residue values of the R and B components and the residue value of the G component.

23. A non-transitory computer readable recording medium storing computer readable instructions to implement the method of claim 8.

24. A non-transitory computer readable recording medium storing computer readable instructions to implement the method of claim 19.

25. A color image and video encoding method using inter-color-component prediction according to an encoding mode, for encoding an original image including at least two color image components, the method comprising:
determining whether the encoding mode is intra mode or inter mode;
generating temporal residue if the encoding mode is the inter mode;
performing residue inter-color-component prediction considering the correlation between respective color components for removing redundant information if the encoding mode is the inter mode to provide residue result value;
performing inter-color-component prediction of the original image if the encoding mode is the intra mode to provide a result value; and entropy encoding the residue result value if the encoding mode is the inter mode and entropy encoding the result value if the encoding mode is the intra mode, wherein if the encoding mode is inter mode, performing frequency domain transform and quantization and outputting the result to an entropy encoding unit, wherein if the encoding mode is intra mode, performing frequency domain transform and quantization, and DC/AC coefficient prediction and outputting the result to an entropy encoding unit, wherein redundant information between the color components is removed from the original image by not generating residues in the intra mode, and wherein the method is performed using at least one processor.

26. A non-transitory computer readable recording medium storing computer readable instructions to implement the method of claim 25.

27. A color image and video decoding method using inter-color-component prediction according to an encoding mode, for decoding a bitstream obtained by compressing an original image including at least two color image components, by using inter-color-component prediction according to an encoding mode, the method comprising:

entropy decoding the bitstream, which was encoded using inter-color component prediction;

determining whether the decoding mode is intra mode or inter mode;

if the decoding mode is inter mode, inverse compressing the entropy decoded data, by performing inverse quantization, and inverse frequency domain transform;

performing residue color compensation from the result of the inverse compressed data;

performing time prediction decoding from the color compensated residue if the decoding mode is inter mode to restore the original image;

performing intra color compensation of each color component from the entropy decoded data to restore the original image;

if the decoding mode is intra mode, inverse compressing the entropy decoded data from the entropy decoded data, by performing DC/AC coefficient prediction, inverse quantization, and inverse frequency domain transformation; and performing intra color compensation of each color component from the result of the inverse compressed data to restore the original image, wherein redundant information between the color components is removed from the original image by not generating residues in the intra mode, and wherein the method is performed using at least one processor.

28. A non-transitory computer readable recording medium storing computer readable instructions implementing the method of claim 27.

* * * * *